Walter & Green.
Vault Cover.
Nº 13,513. Patented Aug. 28, 1855.
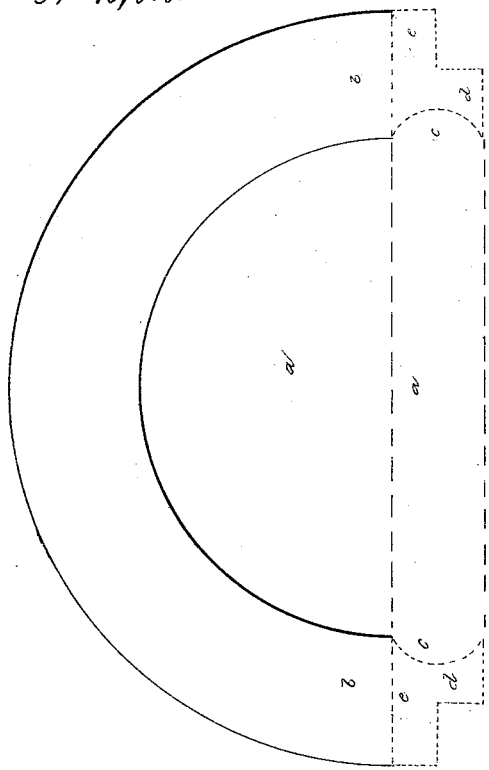
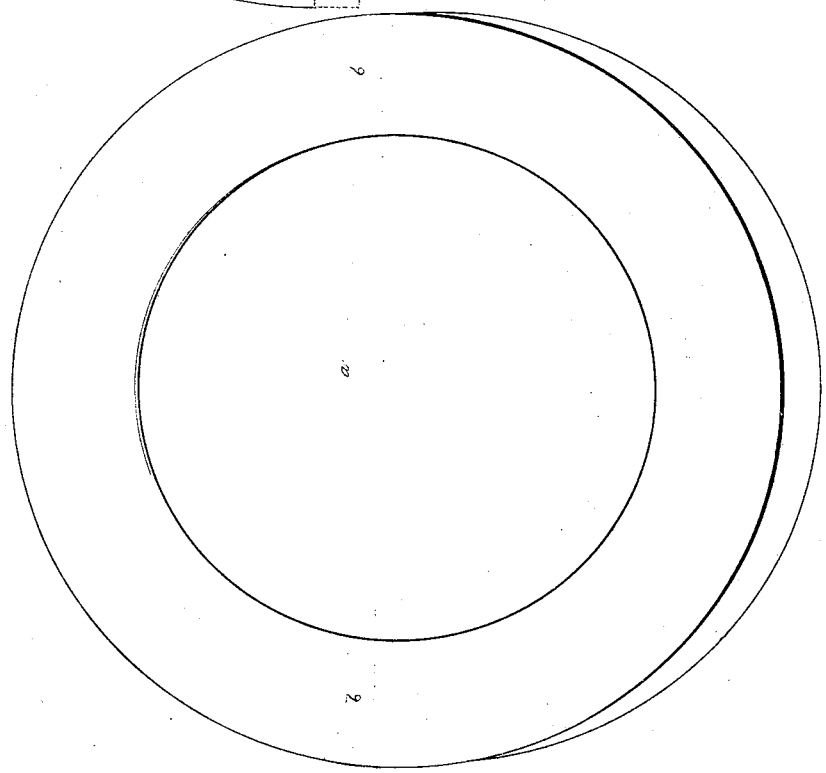

UNITED STATES PATENT OFFICE.

W. P. WALTER AND J. GREEN, OF PHILADELPHIA, PENNSYLVANIA, ASSIGNORS TO WM. P. WALTER.

VAULT-LIGHT.

Specification of Letters Patent No. 13,513, dated August 28, 1855.

*To all whom it may concern:*

Be it known that we, WILLIAM P. WALTER and JACOB GREEN, both of the city of Philadelphia and State of Pennsylvania, have invented a new and Improved Mode of Manufacturing Lights for Vaults, Ships, and Buildings; and we do hereby declare that the following is a full and exact description thereof, reference being had to the accompanying drawings and to the letters of reference marked thereon.

The nature of our invention consists in casting, or putting molten glass, into iron, brass, copper or other metal frames, the frames being made with a groove, or projection, to prevent the glass leaving the frame after the glass has become solid, and annealed. By this arrangement the glass requires no glazing, and being bound tight with the frame, is water-tight, and will stand more pressure than the ordinary glazed glass. The frames can be secured into walls, floors, pavements, and decks, by nails, screws, or pins.

Figure 1: *a*, glass; *b*, frame. Fig. 2, section; *b*, frame; *c*, groove; *d*, shoulder; *e*, flange.

To enable others skilled in the art to make, and use our invention, we will proceed to describe its construction, and operation.

The frames are made with a groove or projection at, *c*. Previous to putting the glass into the frame, the frame is put into a kiln or furnace, and heated for the purpose of expanding the frame. Then the frame is taken from the kiln or furnace, and put upon a metal plate or slab of fireproof clay or stone. The glass is then taken out of the furnace (either gathered, or laded) in as hot a state as possible, and put into the frame. It is then allowed to remain upon the plate or slab, until the glass becomes solid. It is then removed into the annealing kiln, to be annealed. The glass may be put into the frames in the kiln; but we prefer the plate or slab close to the furnace.

Reasons for heating the metal frame: First, glass put into cold frames is "chilled", and generally breaks; second, molten glass put into metal frames, shrinks, a little from the frame, so that as the frame cools in the kiln it contracts, and fits close to the glass without doing harm either to glass or frame.

Some of the advantages in casting or putting the glass into the frame in a soft or fluid state, are as follows:

*Cheapness.*—As the process of putting, or pouring the glass, in a melted state, into the frame, saves the labor of molding the glass, and then securing it, into the frame, or cutting and fitting the glass to its frame, and then securing it in its place by cement or wood.

*Strength.*—The glass and frame, may be made of any desired form and strength, so as to allow fire engines, or loaded carriages to pass over them, and when used in floors, or pavements, present no obstruction to the feet, as the glass is even with the frame, and requires no projection, above the surface of the frame to protect the glass from being broken by wheelbarrows, &c.

*Durability.*—There being no wood, gum or cement, required to firmly hold the glass in its place, they are more durable than where such means are used, and as the glass, takes the form, or fills the opening, of the frame, they may be made of any form and strength for building into walls, and be as thief proof as any other part of the wall.

We are aware that it is a very common device to avail oneself of the expansive and contracting property of metal in fitting metal rims tightly around various articles; and we are also aware that it is not a new device to unite silicious compounds to metal by casting the former in a molten state about the latter, as for instance in the manufacture of porcelain or glass door knobs with metal shanks. We therefore disclaim both of these as broad devices. But What we do claim as our invention and desire to secure by Letters Patent is, The above described improvement in the construction of vault lights, namely casting the molten glass directly into the metal frame, while in a heated state—said metal frame being grooved internally, so that when it contracts on cooling, and contracting as it does more than the glass, this groove shall bind the glass lens tightly in its place and so retain it.

WM. P. WALTER.
JACOB GREEN.

Witnesses:
SAMUEL DAY,
JOHN THOMPSON.